(12) United States Patent
Robbin et al.

(10) Patent No.: US 8,443,038 B2
(45) Date of Patent: May 14, 2013

(54) NETWORK MEDIA DEVICE

(75) Inventors: Jeffrey L. Robbin, Los Altos, CA (US); David Heller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/175,442

(22) Filed: Jul. 1, 2011

(65) Prior Publication Data

US 2011/0264732 A1     Oct. 27, 2011

Related U.S. Application Data

(62) Division of application No. 11/530,855, filed on Sep. 11, 2006, now abandoned.

(51) Int. Cl.
*G06F 15/16* (2006.01)
(52) U.S. Cl.
USPC .......................... 709/203; 709/248; 709/220
(58) Field of Classification Search ................... 709/203, 709/220, 248
See application file for complete search history.

(56) References Cited

U.S. PATENT DOCUMENTS

| | | | |
|---|---|---|---|
| 4,807,224 A | 2/1989 | Naron et al. |
| 5,535,381 A | 7/1996 | Kopper |
| 5,553,222 A | 9/1996 | Milne et al. |
| 5,559,945 A | 9/1996 | Beaudet et al. |
| 5,583,993 A | 12/1996 | Foster et al. |
| 5,587,404 A | 12/1996 | Kroner et al. |
| 5,616,876 A | 4/1997 | Cluts |
| 5,640,566 A | 6/1997 | Victor et al. |
| 5,664,044 A | 9/1997 | Ware |
| 5,664,226 A | 9/1997 | Czako et al. |
| 5,666,530 A | 9/1997 | Clark et al. |
| 5,696,948 A | 12/1997 | Cruz et al. |
| 5,710,922 A | 1/1998 | Alley et al. |
| 5,721,949 A | 2/1998 | Smith et al. |
| 5,722,041 A | 2/1998 | Freadman |
| 5,727,202 A | 3/1998 | Kucala |
| 5,739,451 A | 4/1998 | Winksy et al. |
| 5,745,583 A | 4/1998 | Koizumi et al. |
| 5,751,997 A | 5/1998 | Kullick et al. |
| 5,790,521 A | 8/1998 | Lee et al. |

(Continued)

FOREIGN PATENT DOCUMENTS

| | | |
|---|---|---|
| EP | 0830026 A2 | 3/1998 |
| EP | 0917077 A2 | 5/1999 |

(Continued)

OTHER PUBLICATIONS

"D-Link's New Wireless Media Device Plays Digital Music, Videos, and Photos on Home Television and Stereo;" Jan. 20, 2004; pp. 1-2. Retrieved from the Internet: URL:http://presslink.dlink.com/pri?prid=136.

(Continued)

*Primary Examiner* — Philip B Tran
(74) *Attorney, Agent, or Firm* — Park, Vaughan, Fleming & Dowler, LLP

(57) ABSTRACT

A network media device is described that pulls multimedia data from one or more sources (e.g., a multimedia website or a multimedia server computer) at a first time, stores it to long-term storage within the device and transmits the stored multimedia data to one or more designated multimedia playback devices at a second time.

21 Claims, 5 Drawing Sheets

U.S. PATENT DOCUMENTS

| | | | |
|---|---|---|---|
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,867,668 A | 2/1999 | Spirakis et al. |
| 5,875,354 A | 2/1999 | Charlton et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,931,906 A | 8/1999 | Fidelibus et al. |
| 5,953,350 A | 9/1999 | Higgins |
| 5,963,916 A | 10/1999 | Kaplan |
| 5,969,283 A | 10/1999 | Looney et al. |
| 6,000,000 A | 12/1999 | Hawkins et al. |
| 6,006,274 A | 12/1999 | Hawkins et al. |
| 6,008,777 A | 12/1999 | Yiu |
| 6,038,199 A | 3/2000 | Pawlowski et al. |
| 6,041,023 A | 3/2000 | Lakhansingh |
| 6,061,306 A | 5/2000 | Buchheim |
| 6,085,252 A | 7/2000 | Zhu et al. |
| 6,092,119 A | 7/2000 | Rossmere et al. |
| 6,101,591 A | 8/2000 | Foster et al. |
| 6,125,369 A | 9/2000 | Wu et al. |
| 6,138,245 A | 10/2000 | Son et al. |
| 6,172,948 B1 | 1/2001 | Keller et al. |
| 6,208,044 B1 | 3/2001 | Viswanadham et al. |
| 6,212,359 B1 | 4/2001 | Knox |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,243,772 B1 | 6/2001 | Gori et al. |
| 6,247,135 B1 | 6/2001 | Feague |
| 6,248,946 B1 | 6/2001 | Dwek |
| 6,263,313 B1 | 7/2001 | Milsted et al. |
| 6,263,503 B1 | 7/2001 | Margulis |
| 6,272,545 B1 | 8/2001 | Flanagin |
| 6,282,714 B1 | 8/2001 | Ghori et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,345,256 B1 | 2/2002 | Milsted et al. |
| 6,356,971 B1 | 3/2002 | Katz et al. |
| 6,374,177 B1 | 4/2002 | Lee et al. |
| 6,380,947 B1 | 4/2002 | Stead |
| 6,389,467 B1 | 5/2002 | Eyal et al. |
| 6,397,388 B1 | 5/2002 | Allen |
| 6,411,943 B1 | 6/2002 | Crawford |
| 6,429,880 B2 | 8/2002 | Marcos et al. |
| 6,453,281 B1 | 9/2002 | Walters et al. |
| 6,489,986 B1 | 12/2002 | Allen |
| 6,490,432 B1 | 12/2002 | Wegener et al. |
| 6,493,758 B1 | 12/2002 | McLain |
| 6,523,124 B1 | 2/2003 | Lunsford et al. |
| 6,529,233 B1 | 3/2003 | Allen |
| 6,529,804 B1 | 3/2003 | Draggon et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,587,480 B1 | 7/2003 | Higgins et al. |
| 6,621,768 B1 | 9/2003 | Keller |
| 6,630,963 B1 | 10/2003 | Billmaier |
| 6,636,873 B1 | 10/2003 | Carini et al. |
| 6,659,861 B1 | 12/2003 | Faris et al. |
| 6,664,981 B2 | 12/2003 | Ashe et al. |
| 6,665,803 B2 | 12/2003 | Lunsford et al. |
| 6,684,060 B1 | 1/2004 | Curtin |
| 6,694,200 B1 | 2/2004 | Naim |
| 6,718,348 B1 | 4/2004 | Novak et al. |
| 6,721,489 B1 | 4/2004 | Benyamin et al. |
| 6,728,585 B2 | 4/2004 | Neoh |
| 6,728,729 B1 | 4/2004 | Jawa et al. |
| 6,731,312 B2 | 5/2004 | Robbin |
| 6,757,913 B2 | 6/2004 | Knox |
| 6,760,721 B1 | 7/2004 | Chasen et al. |
| 6,763,345 B1 | 7/2004 | Hempleman et al. |
| 6,766,376 B2 | 7/2004 | Price |
| 6,779,019 B1 | 8/2004 | Mousseau et al. |
| 6,785,542 B1 | 8/2004 | Blight et al. |
| 6,794,566 B2 | 9/2004 | Pachet |
| 6,798,838 B1 | 9/2004 | Ngo |
| 6,801,964 B1 | 10/2004 | Mahdavi |
| 6,831,881 B2 | 12/2004 | Patil et al. |
| 6,845,398 B1 | 1/2005 | Galensky et al. |
| 6,874,037 B1 | 3/2005 | Abram et al. |
| 6,920,179 B1 | 7/2005 | Anand et al. |
| 6,925,595 B1 | 8/2005 | Whitledge et al. |
| 6,928,433 B2 | 8/2005 | Goodman et al. |
| 6,944,880 B1 | 9/2005 | Allen |
| 6,956,562 B1 | 10/2005 | O'Hara et al. |
| 6,959,288 B1 | 10/2005 | Medina et al. |
| 6,978,127 B1 | 12/2005 | Bulthuis et al. |
| 6,981,259 B2 * | 12/2005 | Luman et al. ............... 370/338 |
| 6,985,966 B1 | 1/2006 | Gupta et al. |
| 6,987,221 B2 | 1/2006 | Platt |
| 6,993,532 B1 | 1/2006 | Platt et al. |
| 6,999,826 B1 | 2/2006 | Zhou et al. |
| 7,010,758 B2 | 3/2006 | Bate |
| 7,016,443 B1 | 3/2006 | Splett |
| 7,022,905 B1 | 4/2006 | Hinman et al. |
| 7,024,214 B2 | 4/2006 | Loveland |
| 7,024,491 B1 | 4/2006 | Hanmann et al. |
| 7,024,575 B2 | 4/2006 | Lienhart et al. |
| 7,034,891 B2 | 4/2006 | Joung et al. |
| 7,039,656 B1 | 5/2006 | Tsai et al. |
| 7,047,308 B2 | 5/2006 | Deshpande |
| 7,069,058 B2 | 6/2006 | Kawashima |
| 7,075,000 B2 | 7/2006 | Gang et al. |
| 7,076,204 B2 | 7/2006 | Richenstein et al. |
| 7,082,320 B2 | 7/2006 | Kattukaren et al. |
| 7,084,898 B1 | 8/2006 | Firestone et al. |
| 7,096,271 B1 | 8/2006 | Omoigui et al. |
| 7,111,009 B1 | 9/2006 | Gupta et al. |
| 7,130,892 B2 | 10/2006 | Mukai |
| 7,136,934 B2 | 11/2006 | Carter et al. |
| 7,142,934 B2 | 11/2006 | Janik |
| 7,143,939 B2 | 12/2006 | Henzerling |
| 7,146,322 B2 | 12/2006 | Cowgill |
| 7,174,560 B1 | 2/2007 | Crinon |
| 7,184,774 B2 * | 2/2007 | Robinson et al. .......... 455/452.1 |
| 7,185,084 B2 | 2/2007 | Sirivara et al. |
| 7,194,692 B2 | 3/2007 | Marcos et al. |
| 7,200,357 B2 | 4/2007 | Janik et al. |
| 7,260,714 B2 | 8/2007 | Dawson et al. |
| 7,266,713 B2 | 9/2007 | Lienhard et al. |
| 7,281,141 B2 | 10/2007 | Elkayam et al. |
| 7,283,880 B2 | 10/2007 | Dick |
| 7,295,809 B2 | 11/2007 | Moore |
| 7,295,983 B2 | 11/2007 | Fujiwara et al. |
| 7,302,239 B2 | 11/2007 | Jitsuhara |
| 7,346,698 B2 | 3/2008 | Hannaway |
| 7,359,671 B2 | 4/2008 | Richenstein et al. |
| 7,369,532 B2 | 5/2008 | Silvester |
| 7,370,129 B2 | 5/2008 | Green et al. |
| 7,391,791 B2 | 6/2008 | Balassanian et al. |
| 7,406,294 B1 | 7/2008 | Liu |
| 7,437,158 B2 | 10/2008 | Russell |
| 7,444,388 B1 | 10/2008 | Svendsen |
| 7,469,283 B2 | 12/2008 | Eyal et al. |
| 7,471,988 B2 | 12/2008 | Smith et al. |
| 7,474,677 B2 | 1/2009 | Trott |
| 7,477,653 B2 | 1/2009 | Smith et al. |
| 7,480,746 B2 | 1/2009 | Simon et al. |
| 7,483,538 B2 | 1/2009 | McCarthy et al. |
| 7,502,604 B2 | 3/2009 | Knox |
| 7,505,483 B2 | 3/2009 | Jeon et al. |
| 7,519,681 B2 | 4/2009 | Edwards et al. |
| 7,519,686 B2 | 4/2009 | Hong et al. |
| 7,539,777 B1 | 5/2009 | Aitken |
| 7,542,784 B2 | 6/2009 | Passier et al. |
| 7,555,291 B2 | 6/2009 | Wassingbo |
| 7,561,215 B2 | 7/2009 | Kim et al. |
| 7,577,261 B2 | 8/2009 | Liu et al. |
| 7,606,570 B2 | 10/2009 | Karaoguz et al. |
| 7,617,513 B2 | 11/2009 | McCafferty et al. |

| | | |
|---|---|---|
| 7,620,011 B2 | 11/2009 | Kim et al. |
| 7,627,343 B2 | 12/2009 | Fadell et al. |
| 7,634,227 B2 | 12/2009 | de Jong |
| 7,647,346 B2 | 1/2010 | Silverman et al. |
| 7,680,849 B2 | 3/2010 | Heller et al. |
| 7,689,095 B2 | 3/2010 | Sugiyama et al. |
| 7,698,297 B2 | 4/2010 | Jawa et al. |
| 7,698,723 B2 | 4/2010 | Hicks et al. |
| 7,724,780 B2 | 5/2010 | Baird et al. |
| 7,769,903 B2 | 8/2010 | Robbin et al. |
| 7,797,446 B2 | 9/2010 | Heller et al. |
| 7,821,574 B2 | 10/2010 | Black |
| 8,037,220 B2 | 10/2011 | Moore et al. |
| 2001/0004310 A1 | 6/2001 | Kono |
| 2001/0008535 A1 | 7/2001 | Lanigan |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0021305 A1 | 9/2001 | Sugiyama et al. |
| 2001/0021998 A1 | 9/2001 | Margulis |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0013784 A1 | 1/2002 | Swanson |
| 2002/0013852 A1 | 1/2002 | Janik |
| 2002/0013853 A1* | 1/2002 | Baber et al. .................. 709/232 |
| 2002/0019984 A1 | 2/2002 | Rakib |
| 2002/0045960 A1 | 4/2002 | Phillips et al. |
| 2002/0046315 A1 | 4/2002 | Miller et al. |
| 2002/0055934 A1 | 5/2002 | Lipscomb et al. |
| 2002/0073139 A1 | 6/2002 | Hawkins et al. |
| 2002/0074413 A1 | 6/2002 | Henzerling |
| 2002/0078075 A1 | 6/2002 | Colson et al. |
| 2002/0081098 A1 | 6/2002 | Scally |
| 2002/0095663 A1 | 7/2002 | Joory |
| 2002/0103554 A1 | 8/2002 | Cokes et al. |
| 2002/0113824 A1 | 8/2002 | Myers |
| 2002/0116082 A1 | 8/2002 | Gudorf |
| 2002/0118848 A1 | 8/2002 | Karpenstein |
| 2002/0133515 A1 | 9/2002 | Kagle et al. |
| 2002/0133824 A1 | 9/2002 | Mensch |
| 2002/0138606 A1 | 9/2002 | Robison |
| 2002/0156921 A1 | 10/2002 | Dutta |
| 2002/0161865 A1 | 10/2002 | Nguyen |
| 2002/0164973 A1 | 11/2002 | Janik et al. |
| 2002/0174243 A1 | 11/2002 | Spurgat et al. |
| 2002/0174269 A1* | 11/2002 | Spurgat et al. ................ 710/1 |
| 2002/0194309 A1 | 12/2002 | Carter et al. |
| 2002/0196912 A1 | 12/2002 | Norris |
| 2003/0013492 A1 | 1/2003 | Bokhari et al. |
| 2003/0013493 A1 | 1/2003 | Irimajiri et al. |
| 2003/0030733 A1 | 2/2003 | Seaman et al. |
| 2003/0037254 A1 | 2/2003 | Fischer et al. |
| 2003/0045955 A1 | 3/2003 | Janik |
| 2003/0046434 A1 | 3/2003 | Flanagin et al. |
| 2003/0050058 A1 | 3/2003 | Walsh et al. |
| 2003/0065802 A1 | 4/2003 | Vitkainen et al. |
| 2003/0074457 A1 | 4/2003 | Kluth |
| 2003/0076301 A1 | 4/2003 | Tsuk |
| 2003/0079038 A1 | 4/2003 | Robbin et al. |
| 2003/0083954 A1 | 5/2003 | Namba |
| 2003/0097379 A1 | 5/2003 | Ireton |
| 2003/0112279 A1 | 6/2003 | Irimajiri et al. |
| 2003/0120742 A1 | 6/2003 | Ohgami et al. |
| 2003/0131360 A1 | 7/2003 | Joung et al. |
| 2003/0134589 A1 | 7/2003 | Oba |
| 2003/0158737 A1 | 8/2003 | Csicsatka |
| 2003/0167318 A1 | 9/2003 | Robbin et al. |
| 2003/0181203 A1* | 9/2003 | Cheshire .................. 455/419 |
| 2003/0182315 A1 | 9/2003 | Plastina et al. |
| 2003/0191756 A1 | 10/2003 | Oh |
| 2003/0197725 A1 | 10/2003 | Tuli |
| 2003/0210821 A1 | 11/2003 | Yogeshwar et al. |
| 2003/0221161 A1 | 11/2003 | Balassanian et al. |
| 2003/0221541 A1 | 12/2003 | Platt |
| 2003/0229900 A1 | 12/2003 | Reisman |
| 2004/0001395 A1 | 1/2004 | Keller et al. |
| 2004/0001396 A1 | 1/2004 | Keller et al. |
| 2004/0001494 A1 | 1/2004 | Barrack et al. |
| 2004/0003151 A1 | 1/2004 | Bateman et al. |
| 2004/0004338 A1 | 1/2004 | Jung |
| 2004/0017997 A1 | 1/2004 | Cowgill |
| 2004/0027930 A1 | 2/2004 | Kido |
| 2004/0031058 A1 | 2/2004 | Reisman |
| 2004/0055446 A1 | 3/2004 | Robbin et al. |
| 2004/0057446 A1 | 3/2004 | Varsa et al. |
| 2004/0068536 A1 | 4/2004 | Demers et al. |
| 2004/0072584 A1 | 4/2004 | Kern |
| 2004/0076086 A1 | 4/2004 | Keller et al. |
| 2004/0078416 A1 | 4/2004 | Kawasali et al. |
| 2004/0128198 A1 | 7/2004 | Register et al. |
| 2004/0128402 A1 | 7/2004 | Weaver et al. |
| 2004/0132510 A1 | 7/2004 | Yamashita |
| 2004/0133908 A1 | 7/2004 | Smith et al. |
| 2004/0139180 A1 | 7/2004 | White et al. |
| 2004/0139844 A1 | 7/2004 | Tsuboi |
| 2004/0143442 A1 | 7/2004 | Knight |
| 2004/0157548 A1 | 8/2004 | Eyer |
| 2004/0174896 A1 | 9/2004 | Caspi et al. |
| 2004/0177063 A1* | 9/2004 | Weber et al. ........................ 707/3 |
| 2004/0177371 A1 | 9/2004 | Caspi et al. |
| 2004/0177377 A1 | 9/2004 | Lin et al. |
| 2004/0179540 A1 | 9/2004 | Lee et al. |
| 2004/0193900 A1 | 9/2004 | Nair |
| 2004/0215611 A1 | 10/2004 | Jawa et al. |
| 2004/0215810 A1 | 10/2004 | Tan et al. |
| 2004/0216108 A1 | 10/2004 | Robbin |
| 2004/0221088 A1 | 11/2004 | Lisitsa et al. |
| 2004/0223622 A1 | 11/2004 | Lindemann et al. |
| 2004/0225762 A1 | 11/2004 | Poo |
| 2004/0234088 A1 | 11/2004 | McCarty et al. |
| 2004/0236568 A1 | 11/2004 | Giuillen et al. |
| 2004/0242224 A1 | 12/2004 | Janik et al. |
| 2004/0250273 A1 | 12/2004 | Swix et al. |
| 2004/0252604 A1 | 12/2004 | Johnson et al. |
| 2004/0255326 A1 | 12/2004 | Hicks et al. |
| 2004/0261040 A1 | 12/2004 | Radcliffe et al. |
| 2004/0261112 A1 | 12/2004 | Hicks et al. |
| 2004/0267825 A1 | 12/2004 | Novak et al. |
| 2005/0010616 A1 | 1/2005 | Burks |
| 2005/0055444 A1 | 3/2005 | Venkatasubramanian |
| 2005/0071375 A1 | 3/2005 | Houghton et al. |
| 2005/0080915 A1 | 4/2005 | Shoemaker |
| 2005/0147130 A1 | 7/2005 | Hurwitz |
| 2005/0174488 A1 | 8/2005 | Chennakeshu |
| 2005/0201360 A1 | 9/2005 | Redstone |
| 2005/0201398 A1 | 9/2005 | Naik et al. |
| 2005/0207726 A1 | 9/2005 | Chen |
| 2005/0226233 A1 | 10/2005 | Kryuchkov et al. |
| 2005/0235015 A1 | 10/2005 | Abanami et al. |
| 2005/0235048 A1 | 10/2005 | Costa-Requena et al. |
| 2005/0240494 A1 | 10/2005 | Cue et al. |
| 2005/0240661 A1 | 10/2005 | Heller et al. |
| 2005/0240745 A1 | 10/2005 | Iyer et al. |
| 2005/0254447 A1 | 11/2005 | Miller-Smith |
| 2005/0262528 A1 | 11/2005 | Herley et al. |
| 2005/0265316 A1 | 12/2005 | Liu et al. |
| 2005/0273790 A1* | 12/2005 | Kearney et al. ............... 719/328 |
| 2005/0289224 A1 | 12/2005 | Deslippe et al. |
| 2006/0007943 A1 | 1/2006 | Fellman |
| 2006/0015580 A1 | 1/2006 | Gabriel et al. |
| 2006/0027080 A1 | 2/2006 | Schultz |
| 2006/0030961 A1 | 2/2006 | Lin |
| 2006/0062242 A1 | 3/2006 | Dacosta |
| 2006/0062243 A1 | 3/2006 | Dacosta |
| 2006/0069724 A1 | 3/2006 | Langdon |
| 2006/0074637 A1 | 4/2006 | Berreth |
| 2006/0083194 A1 | 4/2006 | Dhrimaj |
| 2006/0090202 A1 | 4/2006 | Liu et al. |
| 2006/0092844 A1 | 5/2006 | Jeon et al. |
| 2006/0100978 A1 | 5/2006 | Heller et al. |
| 2006/0106806 A1 | 5/2006 | Sperling |
| 2006/0117371 A1 | 6/2006 | Margulis |
| 2006/0126667 A1 | 6/2006 | Smith et al. |
| 2006/0143455 A1 | 6/2006 | Gitzinger |
| 2006/0159109 A1 | 7/2006 | Lamkin et al. |

| | | | |
|---|---|---|---|
| 2006/0167982 A1 | 7/2006 | Jawa et al. | |
| 2006/0168340 A1 | 7/2006 | Heller et al. | |
| 2006/0168351 A1 | 7/2006 | Ng et al. | |
| 2006/0224620 A1 | 10/2006 | Silverman et al. | |
| 2006/0245451 A1 | 11/2006 | Wakid | |
| 2006/0253279 A1 | 11/2006 | Sung | |
| 2006/0274747 A1 | 12/2006 | Duchscher et al. | |
| 2006/0277216 A1 | 12/2006 | Shukhman | |
| 2006/0288057 A1 | 12/2006 | Collins et al. | |
| 2007/0033052 A1 | 2/2007 | Cowgill | |
| 2007/0038941 A1 | 2/2007 | Wysocki et al. | |
| 2007/0067309 A1 | 3/2007 | Klein et al. | |
| 2007/0073723 A1 | 3/2007 | Ramer et al. | |
| 2007/0073728 A1 | 3/2007 | Klein et al. | |
| 2007/0074118 A1 | 3/2007 | Robbin et al. | |
| 2007/0084333 A1 | 4/2007 | Robbin et al. | |
| 2007/0088727 A1 | 4/2007 | Kindig | |
| 2007/0088764 A1 | 4/2007 | Yoon et al. | |
| 2007/0124680 A1 | 5/2007 | Robbin et al. | |
| 2007/0130541 A1 | 6/2007 | Louch et al. | |
| 2007/0169115 A1* | 7/2007 | Ko et al. | 717/174 |
| 2007/0185919 A1 | 8/2007 | Kaplan et al. | |
| 2007/0203954 A1 | 8/2007 | Vargas et al. | |
| 2007/0220552 A1 | 9/2007 | Juster et al. | |
| 2007/0271312 A1 | 11/2007 | Heller et al. | |
| 2007/0291323 A1 | 12/2007 | Roncal | |
| 2008/0018927 A1 | 1/2008 | Martin et al. | |
| 2008/0028008 A1 | 1/2008 | Brunet et al. | |
| 2008/0086494 A1 | 4/2008 | Heller et al. | |
| 2008/0168185 A1 | 7/2008 | Robbin et al. | |
| 2008/0168245 A1 | 7/2008 | DeAlley et al. | |
| 2008/0168391 A1 | 7/2008 | Robbin et al. | |
| 2008/0168525 A1 | 7/2008 | Heller et al. | |
| 2008/0168526 A1 | 7/2008 | Robbin et al. | |
| 2009/0290725 A1 | 11/2009 | Huang | |

FOREIGN PATENT DOCUMENTS

| | | |
|---|---|---|
| EP | 0982732 A1 | 3/2000 |
| EP | 1028425 A2 | 8/2000 |
| EP | 1122931 A2 | 8/2001 |
| EP | 1143719 A | 10/2001 |
| EP | 1353269 A | 10/2003 |
| EP | 1408427 A2 | 4/2004 |
| EP | 1429569 A | 6/2004 |
| EP | 1463334 A2 | 9/2004 |
| EP | 1523171 A1 | 4/2005 |
| EP | 1548740 A2 | 6/2005 |
| EP | 2375678 A1 | 10/2011 |
| JP | 2000-339917 | 12/2000 |
| JP | 2001-93226 | 4/2001 |
| JP | 2001-117800 | 4/2001 |
| JP | 2003-077214 | 3/2003 |
| JP | 2003-303137 | 10/2003 |
| JP | 2003-319485 | 11/2003 |
| KR | 10-2001-0063284 A | 12/1999 |
| KR | 10-2001-0079176 A1 | 8/2001 |
| KR | 10-2002-0011027 A | 2/2002 |
| KR | 10-2006-0035634 A | 4/2006 |
| KR | 10-0599204 B1 | 7/2006 |
| WO | 9516950 | 6/1995 |
| WO | 0043914 A1 | 7/2000 |
| WO | 2001-26374 A1 | 4/2001 |
| WO | 0133569 A1 | 5/2001 |
| WO | 0167753 A1 | 9/2001 |
| WO | 0225610 A1 | 3/2002 |
| WO | 0225935 A2 | 3/2002 |
| WO | 02065723 A1 | 8/2002 |
| WO | 03009601 A1 | 1/2003 |
| WO | 03023786 A2 | 3/2003 |
| WO | 0336541 A1 | 5/2003 |
| WO | 03038637 A1 | 5/2003 |
| WO | 2004004338 A1 | 1/2004 |
| WO | 9408337 | 4/2004 |
| WO | 2004034286 A1 | 4/2004 |
| WO | 2004057474 A1 | 7/2004 |
| WO | 2004084413 A2 | 9/2004 |
| WO | 2005060387 A2 | 7/2005 |
| WO | 2005114472 A1 | 12/2005 |
| WO | 2006047578 A2 | 5/2006 |

OTHER PUBLICATIONS

Search Report From Co-pending PCT patent application (PCT/US2005/011635) dated Jul. 28, 2005.

Palacharla, et al.; "Design and Implementation of a Real-time Multimedia Presentation System using RTP," Computer Software and Applications Conference; COMPSAC '94, Aug. 13, 1997; pp. 376-381.

Perkins C.; "RTP Audio and Video for the Internet" 2003, Addison-Weslery, pp. 107-109.

International Search Report and Written Opinion received in corresponding PCT application No. PCT/US2006/062003 dated Aug. 30, 2007.

Search Report and Written Opinion received in Co-pending PCT patent application (PCT/US2005/011635) dated Oct. 21, 2005.

Linksys "New Linksys Wireless Home Products Showcased at CEBIT 2004" Internet Article (Mar. 18, 2004) www.broadbandbuyerco.uk/Shop/pageTextDetail.asp?SetID=2&TestID+473.

Apple, "Mac OS X:Bonjour," Technology Brief, Apr. 2005, 6-pgs.

Apple, "AirPort Express," Technology Overview, Jul. 2004, 31-pgs.

Shulzrinne et al., "Request for Comments: 2326," Network Working Group, Apr. 1998, 92-pgs.

Mills, David L., "Request for Comments: 1305," Network Working Group, Mar. 1992, 113-pgs.

Shulzrinne et al., "Request for Comments: 3550," Network Working Group, Jul. 2003, 104-pgs.

Stewart et al., "Request for Comments: 3758," Network Working Group, May 2004, 22-pgs.

Titmus, Richard, "Softsqueeze 2.0," obtained from http://softsqueeze.soucefoge.net/, generated Jun. 8, 2006, copyright 2004, 2005, 3-pgs.

Titmus, Richard, "Softsqueeze 2.0," obtained from http://softsqueeze.soucefoge.net/sync.html, generated Jun. 8, 2006, copyright 2004, 2005, 3-pgs.

Slim Devices, Inc., "Slim Devices: Squeezebox: Free Your Music!," obtained from http://www.slimdevices.com/index.html, generated Jun. 8, 2006, copyright 2002-2005, 2-pgs.

Slim Devices, Inc., "Slim Devices: Squeezebox: Overview," obtained from http://www.slimdevices.com/pi_overview.html, generated Jun. 21, 2006, copyright 2002-2006, 3-pgs.

Slim Devices, Inc., "Slim Devices: Support: FAQ," obtained from http://www.slimdevices.com/su_faq.html, generated Jun. 21, 2006, copyright 2002-2006, 31-pgs.

SNARFED.ORG, "History of Synchronizing mp3 playback," obtained from http://snarfed.org/exec/history?name=synchronizing+mp3+playback, generated Jun. 8, 2006, 2-pgs.

Maulik, "Synchronizing mp3 playback, version #1," obtained from http://snarfed.org/exec/version?name=synchronizing+mp3+playback&version=1, generated Jun. 8, 2006, version #1 dated Nov. 8, 2004 in history, 2-pgs.

Maulik, "Synchronizing mp3 playback, version #2," obtained from http://snarfed.org/exec/version?name=synchronizing+mp3+playback&version=2, generated Jun. 8, 2006, version #2 dated Dec. 28, 2004 in history, 2-pgs.

Maulik and Ryan, "Synchronizing mp3 playback, version #3," obtained from http://snarfed.org/exec/version?name=synchronizing+mp3+playback&version=3, generated Jun. 8, 2006, version #3 dated Jan. 2, 2005 in history, 3-pgs.

Maulik and Ryan, "Synchronizing mp3 playback, version #4," obtained from http://snarfed.org/exec/version?name=synchronizing+mp3+playback&version=4, generated Jun. 8, 2006, version #4 dated Jan. 3, 2005 in history, 3-pgs.

Maulik and Ryan, "Synchronizing mp3 playback, version #5," obtained from http://snarfed.org/exec/version? name=synchronizing+mp3+playback&version=5, generated Jun. 8, 2006, version #5 dated Jan. 19, 2005 in history, 3-pgs.

Maulik and Ryan, "Synchronizing mp3 playback, version #6," obtained from http://snarfed.org/exec/version?name=synchronizing+mp3+playback&version=6, generated Jun. 8, 2006, version #6 dated Feb. 2, 2005 in history, 3-pgs.

Maulik and Ryan, "Synchronizing mp3 playback, version #7," obtained from http://snarfed.org/exec/version?name=synchronizing+mp3+playback&version=7, generated Jun. 18, 2006, version #7 dated Feb. 21, 2005 in history, 3-pgs.

Maulik and Ryan, "Synchronizing mp3 playback, version #8," obtained from http://snarfed.org/exec/version?name=synchronizing+mp3+playback&version=8, generated Jun. 8, 2006, version #8 dated Feb. 23, 2005 in history, 3-pgs.

Maulik and Ryan, "Synchronizing mp3 playback, version #9," obtained from http://snarfed.org/exec/version?name=synchronizing+mp3+playback&version=9, generated Jun. 8, 2006, version #9 dated Mar. 3, 2005 in history, 3-pgs.

Maulik and Ryan, "Synchronizing mp3 playback, version #17," obtained from http://snarfed.org/exec/version?name=synchronizing+mp3+playback&version=9, generated Jun. 8, 2006, version #17 dated Feb. 5, 2006 in history, 4-pgs.

SNARFED.ORG, "libmsntp," obtained from http://snarfed.org/space/libmsntp, generated Jun. 8, 2006, undated, 2-pgs.

K*Software, "KQUERY.COM," obtained from http://www.kquery.com/index.php?page=software_info&subpage=1&id=8, generated Jun. 8, 2006, copyright 2004, 4-pgs.

Nullsoft, "WINAMP.COM | Plug-ins," obtained from http://winamp.com/plugins/details.php?id=15667, generated Jun. 8, 2006, copyright 2006, 2-pgs.

Myradus, LLC, "Myradus Media Player Puppeteer for iTunes," obtained from http://www.myradus.com/Product_MediaPlayerPuppeteerForm.aspx, generated Jun. 8, 2006, copyright 2004-2005, 1-pg.

Slim Devices, Inc., "Squeezebox 2: Owner's Guide," copyright 2005, 28-pgs.

Slim Devices, Inc., "Squeezebox: Owner's Guide," copyright 2006, 32-pgs.

International Search Report received in PCT application No. PCT/US2006/062355 dated Jun. 6, 2007.

"Communication Relating to the Results of the Partial International Search" received in corresponding PCT Application No. PCT/US2006/062355 dated May 3, 2007.

International Search Report and Written Opinion for Patent application No. PCT/US2006/062003 mail date of Jul. 10, 2007, 21 pages.

Office Communication of Dec. 30, 2009 for U.S. Appl. No. 10/862,115, Board of Patent Appeals and Interferences Docketing Notice, 2 pages.

Final Office Action of Nov. 25, 2008, for U.S. Appl. No. 10/862,115, 22 pages.

Non-Final Office Action of Mar. 20, 2008 for U.S. Appl. No. 10/862,115; 16 pages.

Office Action for U.S. Appl. No. 11/530,855 dated Jun. 24, 2009.

Office Action for U.S. Appl. No. 11/306,557 dated Aug. 18, 2009.

Office Action for U.S. Appl. No. 11/530,855 dated Apr. 5, 2011.

Office Action for U. S. Appl. No. 11/530,855 dated Oct. 12, 2010.

Office Action for U.S. Appl. No. 11/530,855 dated Dec. 29, 2009.

Communication from European Patent Office for European Patent Application No. EP05731980, dated Dec. 8, 2010 (6 pgs.)

"Apple Announces iTunes 2," Press Release, Apple Computer, Inc., dated Oct. 23, 2001 http://www.apple.com/pr/library/2001/10/23Apple-Announces-iTunes-2.html] downloaded Apr. 8, 2012 (U.S. Appl. No. 11/519,429).

Specification Sheet, iTunes 2, Apple Computer, Inc., Oct. 2001. (U.S. Appl. No. 11/519,429).

iTunes 2, Playlist Related Help Screens, iTunes v2.0 Apple Computer, Inc., Oct. 23, 2001 (U.S. Appl. No. in 11/519,429).

Rosenberg, J. et al., "SIP, Session Initiation Protocol", 20020601, 20020600, Jun. 1, 2001, Retrieved from rfc-editor.org/in-notes/rfc3261.txt on Aug. 18, 2011, 232 pages.

Extended European Search Report for EP Patent Application No. EP10184674 mailed on Dec. 13, 2010, 9 pages cited in U.S. Appl. No. 11/306,557 in IDS filed Aug. 19, 2011.

Top Stores of Dec. 18, 2001: Apple posts Automated Scripts for iTunes 2.03. downloaded 9 pages on Apr. 11, 2012 from the internet at: http://www.xlr8yourmac.com/archive/dec01/121801.html (U.S. Appl. No. 11/519,429).

iTunes-perl, copyright 2004-2006 by Jay McGavren, obtained from the Internet at http://code.googlecom, pp. 7. (downloaded 5 pages on Jan. 13, 2012 from http://code.google.com/p/itunes-perl/wiki/Usage) (U.S. Appl. No. 11/519,429).

Pocket Tunes 5.0.0. copyright 2002-2009 Normsoft, Inc., (pp. 1-25, obtained from the Internet at: http://www.pocket-tunes.com/userguide/en.win)—[Downloaded 18 pages on Apr. 10, 2012 at http://www.pocket-tunes.com/userguide/en/) (U.S. Appl. No. 11/519,429).

"Perfect guide for digital/audio technique to enjoy music in PC", Nobuya Fukuda, published in "Nikkei Click", Japan, Nikkei business Publications, Inc., Sep. 8, 1999, vol. 6/No. 10, p. 169. (U.S. Appl. No. 11/519,429).

Bott, "Special Edition Using Microsoft 1-18 Windows Millennium Passage", Special Edition Using Microsoft Windows Millennium Edition, Nov. 3, 2000, pp. 1-24. (U.S. Appl. No. 11/519,429).

Clifton, David, Pipe.c, A Kla2 Module', 2003, 10 pages. (Retrieved on Oct. 17, 2011) from http://www.codelode.com/Kernel/kla2pepec.html. [Apr. 18, 2012 downloaded from http://web.archive.org/20040107194820/http://www.codelode.com/Kernel/kla2pipec...] (U.S. Appl. No. 11/306,557).

Hughes, M., "Turning Streams Inside Out, Part 2: Optimizing internal Java I/O", Sep. 3, 2002, 12 pages. [downloaded Apr. 11, 2012 at: http://underpop.free.fr/j/java/streams/j-io2.pdf] (U.S. Appl. No. 11/306,557).

International Search Report of Mar. 29, 2006 for PCT Patent Application No. PCTUS2005/020139, 7 pages. (U.S. Appl. No. 11/306,557).

International Preliminary Report on Patentability of Dec. 28, 2006 and Written Opinion for PCT Patent Application No. PCT/US2005/020139, 12 pages (U.S. Appl. No. 11/306,557).

Final Office Action of Jun. 23, 2011 for U.S. Appl. No. 11/696,679, 19 pages.

Non-Final Office Action of Jan. 4, 2011 for U.S. Appl. No. 11/696,679, 18 pgs.

SoundJam MP Plus, Representative Screens, published by Cassady & Greene, Inc., Salinas, CA 2000. (U.S. Appl. No. 11/519,429).

Non-final office action for U.S. Appl. No. 11/306,557 dated Jul. 19, 2011.

M. Nilsson; IDS tag versions 2.4.0.—Main Structure; Nov. 1, 2000; http://www.id3.org/id3v2.4.0-structure?~action=print dowload Jul. 6, 2011 (U.S. Appl. No. 11/519,429).

Hei et al., "iPod+iTunes", Markt+Technik Verlag, Dec. 22, 2006. (U.S. Appl. No. 11/519,429).

"iPod +iTunes", Markt+Technik Verlag, 2007. (U.S. Appl. No. 11/519,429).

Erdmann et al., "iPod + iTunes", O'Reilly, 2006. (U.S. Appl. No. 11/519,429).

"Pocket PC Phone User Manual", High Tech Computer Corp., 2006; 208 pages, Downloaded Jul. 2011 www.htc.com (U.S. Appl. No. 11/519,429).

Replay Gain, "Replay Gain—A proposed Standard," Oct. 7, 2001, available from http://replaygain.hydrogenaudio.org/index.html and http://replaygain.hydrogenaudio.org/outline.html.; (U.S. Appl. No. 11/519,429).

"Digital Still Cameras—Downloading Images to a Computer," Mimi Chakarova et al., Multi-Media Reporting and Convergence, 2 pgs. (U.S. Appl. No. 11/519,429).

Glenn Fleishman, "Handheld iPod joins MP3 band a bit late, but is standout player," Nov. 6, 2001, http://seattletimes,nwsource.com/html/businesstechnology/134361811_ptmacc040.html. [Downloaded Jul. 21, 2011 from http://web.archive.org/...001110233639/http://seattletimes.nwsource.com/html/businesstechnology/134361811_ptmacc040.html] (U.S. Appl. No. 11/519,429).

"Hewlett Packard Jornada 525 Color Pocket PC," downloaded Jan. 25, 2002, http://www.pc4d.com/electronics/products/56/jornada_525_color_pocket_pc.shtml. (U.S. Appl. No. 11/519,429).

iTunes, Digital Music for your Mac, Apple Computer, Inc., downloaded Oct. 22, 2011, http://www.apple.com/itunes/ (U.S. Appl. No. 11/519,429).

"Rio Portable Music Player," Web Review, downloaded Jan. 25, 2002, http://www.webreviews.com/9901/rio.html. (U.S. Appl. No. 11/519,429).

Andy Lindauer, "What's in you Pocket?," Edgereview, downloaded Jan. 25, 2002, http://www.edgereview.com/print.cfm?Type+aag&ID=286 (U.S. Appl. No. 11/519,429).

Handbook for Palm™ m500 Series Handhelds,User Manual.—(286 pages) (U.S. Appl. No. 11/519,429).

Sinitsyn, "A Synchronization Framework for Personal Mobil Servers," Proceedings of the Second IEEE Annual Conference on Pervasive Computing and communications Workshops, Piscataway, NJ, Mar. 14, 2004, pp. 1-4 5 pages retrieved from IEEE on Jul. 2011 (U.S. Appl. No. 11/519,429).

Vetro et al., "Media Conversions to Support Mobile Users," IEEE Canadian Conference on Electrical and Computer Engineering, Piscataway, NJ, May 13, 2001, pp. 606-612 pp. 1-6 from IEEE on Jul. 2011 (U.S. Appl. No. 11/519,429).

Zheng et al., "MobiGATE: a mobile gateway proxy for the active deployment of transport entities," Proceedings of the 2004 International Conference on Parallel Processing, Piscataway, NJ, Aug. 15, 2004 pp. 1-8 from IEEE on Jul. 2011 (U.S. Appl. No. 11/519,429).

RCA Lyra User's Guide, RD2201/2202/2204, www.lyrazone.com. pp. 1-37, (1999). (U.S. Appl. No. 11/519,429).

Compaq Computer Corp., copyright 1991, Personal Jukebox User Manual, pp. 1-29. (U.S. Appl. No. 11/519,429).

"About MusicMatch Jukebox," MusicMatch Jukebox v4 Help. pp. 1-4, (1999) (U.S. Appl. No. 11/519,429).

RealJukebox Plus Manual, Real Networks, Inc., copyright 1999, pp. 1-83, RealJukebox, Real Networks, Inc., webpages downloaded Oct. 27, 2005 http://www.real.com/Jukebox/release_notes.html#. (U.S. Appl. No. 11/519,429).

TuneBase 100 User Guide, A CD Library Management System, Escient, Inc. copyright 1999. (101 Pages) (U.S. Appl. No. 11/519,429).

TuneBase Pro Mk-II User's Guide, Escient, Inc., (1999) Downloaded Jul. 25, 2011 (U.S. Appl. No. 11/519,429).

Window's Media Player 6.4, Microsoft Corp., copyright 1999, software available at http://www.oldversion.com/program.php?n=wmp [~Downloaded Jul. 13, 2011 at: http://www.microsoft.com/download.en/confirmation.axps?displaylang-en&id=22758] (U.S. Appl. No. 11/519,429).

De Herrera, Chris, "Microsoft ActiveSync 3.1" Version 1.02, (Oct. 13, 2000 Downloaded Aug. 16, 2011 From http://www.pocketpcfaq.com/wce/activesync3.1.htm (U.S. Appl. No. 11/519,429).

Firewire, IEEE 1394 (also known as Sony's iLink), (http://www.wikipedia.org/wiki/Firewire (1995)). Download Jul. 13, 2011—http://en.wikipedia.org/wiki/IEEE_1393_interface (U.S. Appl. No. 11/519,429).

Miniman, "Applian Software's Replay Radio and Player v1.02," Product review, pocketnow.com, http://www.pocketnow.com/review/replay.htm, Jul. 31, 2001. Downloaded Aug. 25, 2011 http://web/archive.org/web/20010805081914/http://www.pocketnow.com/reviews/reply/reply.HTM (U.S. Appl. No. 11/519,429).

Personal Jukebox (PJB), "Systems Research Center and PAAD," Compaq Computer Corp., Oct. 13, 2000, http://research.compaq.com/SRC/pjb/. (U.S. Appl. No. 11/519,429).

Compaq, "Personal Jukebox," Jan. 24, 2001, available from http://research.compaq.com/SRC/pjb/, 3 pgs. (U.S. Appl. No. 11/519,429).

Steinberg, "Sonicblue Rio Car," Product Review, Dec. 12, 2000, http://electronics.cnet.com/electronics/0-6342420-1304-4098389.html. (U.S. Appl. No. 11/519,429).

Andrew Birrell, "Personal Jukebox (PJB)," Oct. 13, 2000 available from http://birrell.org/andrew/talks/pjb-overview.ppt. (U.S. Appl. No. 11/519,429).

Travis Butler, "Portable MP3: The Nomad Jukebox," Aug. 1, 2001, available from http://db.tidbits.com/getbits.acgi?tbart=06261. downloaded Jul. 13, 2011 at http://www.tidbits.com/article/6261 (U.S. Appl. No. 11/519,429).

Travis Butler, "Archos Jukebox 6000 Challenges Nomad Jukebox," Aug. 13, 2001, available from http://db.tidbits.com/getbits.acgi?tbart=06521—Downloaded Jul. 13, 2011 @ http://www.tidbits.com/article/6521?print version=1 (U.S. Appl. No. 11/519,429).

Adam C. Engst. "SoundJam Keeps on Jammin'." Jun. 19, 2000, available from http://db.tidbits.com/getbits.acgi?tbart=05988. downloaded Jul. 25, 2011 at http?..db.tidbits.com/article/5988?print?version+1 (U.S. Appl. No. 11/519,429).

Musicmatch, "Musicmatch and Xing Technology Introduce Musicmatch Jukebox," May 18, 1998, available from http://www.musicmatch.com/info/company/press/releases/?year+1998&release=2downloaded Aug. 16, 2011 http://www.thefreelibrary.com/MusicMatch+and+Xing+Technology+Introduce+Music-Match+Jukebox-a020605808 (U.S. Appl. No. 11/519,429).

"Nomad Jukebox," User Guide, Creative Technology Ltd., Version 1, Aug. 2000. [38 pages downloaded Aug. 16, 2011] (U.S. Appl. No. 11/519,429).

Alicia Awbrey, press release entitled "Apple's iPod Available in Stores Tomorrow," Nov. 9, 2001 [downloaded Jul. 14, 2011 at http://www.apple.com/pr/library/2001/11/09Apple-s-iPod-Available] (U.S. Appl. No. 11/519,429).

"Apple Introduces iTunes—World's Best and Easiest to Use Jukebox Software," Macworld Expo, San Francisco, Jan. 9, 2011 [~2 pages Downloaded on Jul. 14, 2011 at http://www.apple.com/pr/library/2001/01/09Apple-Introduces-iTunes-Worlds-Best and Ea...] (U.S. Appl. No. 11/519,429).

iTunes, Playlist Related Help Screens, iTunes v1.0, Apple Computer, Inc., Jan. 2001 (U.S. Appl. No. 11/519,429).

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc. 2000. 80 pages (U.S. Appl. No. 11/519,429).

Bridgman, "Windows XP Expert Zone Community Columnist", Using Windows Mobile-based Portable Media Centers and Windows Media Player 10, Aug. 25, 2004, 1-11. (U.S. Appl. No. 11/519,429).

Etchison, "Accelerated discrete Adjustment of the Parameters of a Process", IBM Technical Disclosure Bulletin, vol. 15, No. 5, Oct. 1, 1972, 2 pgs. (U.S. Appl. No. 11/519,429).

Nutzel et al., "Sharing System for Future HiFi Systems", Proceedings of the Fourth International Conference on Web Delivering of Music, Sep. 13, 2004, 8 pgs. [9 pages downloaded] (U.S. Appl. No. 11/519,429).

Wikipedia: "iTunes", www.wikipedia.com, May 9, 2005, 6 pages. (U.S. Appl. No. 11/519,429).

International Search Report and Written Opinion for PCT/US2007/078043, mailed Aug. 18, 2008 (U.S. Appl. No. 11/519,429).

Iriver, "PMP140/120", Sep. 13, 2004, 1-2 pgs. (U.S. Appl. No. 11/519,429).

MG-25, Portable MPEG4 Player (MG-25), Jul. 29, 2004, 1-3 pgs. (U.S. Appl. No. 11/519,429).

Skarlatos et al., "Sprite Backup 5.0", Internet Publication, www.pocketnow.com/index.php?a+portal_print&t=review&id=788, Mar. 6, 2005 (U.S. Appl. No. 11/519,429).

Apple Inc., "Apple-Downloads-Dashboard", http://www.apple.com/downloads/dashboard, downloaded Dec. 16, 2008, pp. 102 (U.S. Appl. No. 11/519,429).

"Diamond Multimedia Announces Rio PMP300 Portable MP3 Music Player", Press Release, http://news.harmony-central.com/Newp/1988/Rio-Pump300.html, Sep. 14, 1998, 4 pgs. Downloaded on Aug. 16, 2011—http://www.archive.org/web/20030705005208/http://news.harmony-central.com/Newp/1998/Rio-PMP300/html (U.S. Appl. No. 11/519,429).

M. Nilsson; ID3tag version 2.3.0; Feb. 3, 1999, http://www.id3lib.or/idev2.3.0.html [30 pages Jun. 29, 2011 at http://www/id3.org/id3v2.3.0?action=print] (U.S. Appl. No. 11/519,429).

* cited by examiner

NETWORK MEDIA DEVICE

CROSS-REFERENCE TO RELATED APPLICATIONS

This application is a divisional of co-pending U.S. patent application entitled "Network Media Device," filed Sep. 11, 2006 (Ser. No. 11/530,855).

This application claims priority to U.S. patent applications entitled "Networked Media Station," filed 4 Jun. 2004 (Ser. No. 10/862,115) and "System and Method for Synchronizing Media Presentation at Multiple Recipients," filed 2 Jan. 2006 (Ser. No. 11/306,557), both of which are hereby incorporated by reference.

This application is also related to U.S. patent application entitled "Transfer and Synchronization of Media Data", filed on Sep. 11, 2006, (Ser. No. 11/519,429), which is hereby incorporated by reference.

BACKGROUND

With the increasing capacity and capability of personal computers, as well as improved multimedia interfaces for these computers, it has become popular to use personal computers as a repository for multimedia content, such as songs, movies, etc. Particularly with music, the increased popularity of storing multimedia information on a personal computer has resulted in a variety of products and services to serve this industry. For example, a variety of portable players of encoded multimedia information have been developed, including, for example, the iPod® produced by Apple Computer. Additionally, services have been developed around these devices, which allow consumers to purchase music and other multimedia information in digital form suitable for storage and playback using personal computers, including, for example, the iTunes® music service, also run by Apple Computer. (IPOD and ITUNES are registered trademarks of Apple Computer, Inc.)

Services such as iTunes and the substantially unlimited storage space provided by modern personal computer systems has resulted in an environment where many consumers use their personal computer as their primary vehicle for obtaining, storing, and accessing multimedia information. Because consumers may access their multimedia content at virtually any time of the day, however, this implies that one's personal computer system must be powered and operational at all times. Additionally, consumers may prefer to experience certain media content, particularly video content such as movies, using more entertainment-oriented devices, such as home theater systems, which typically include larger screens and higher fidelity audio systems than personal computer systems.

Thus, it would be beneficial to provide a mechanism whereby a consumer could off-load, over a computer network, specified multimedia content to a playback device that could, at a later time, send the information to conventional entertainment devices such as stereo equipment, televisions, home theatre systems, etc.

SUMMARY

A network media device is described that receives multimedia data from one or more sources (e.g., a multimedia website or a multimedia server computer) at a first time, stores it to long-term storage within the device and transmits the stored multimedia data to one or more designated multimedia playback devices at a second time. In some embodiments, the network media device obtains multimedia data using a pull operation. In one embodiment, the pull operation is effected through an Ethernet (wired or wireless) connection. In another embodiment the pull operation is effected through a peripheral connection (e.g., a USB or FireWire interface). Media content may also be pushed to the device using the same interfaces. In yet another embodiment, the network media device may also stream multimedia data from another source, obtained through either a pull or push operation.

Figure shows a graphical user interface used to control synchronization between a network media device and a content source in accordance with one embodiment of the invention.

DETAILED DESCRIPTION

The following description is presented to enable any person skilled in the art to make and use the invention as claimed and is provided in the context of devices and applications compatible with computer systems manufactured by Apple Computer, Inc. of Cupertino, Calif., are illustrative only and should not be considered limiting in any respect. Accordingly, the claims appended hereto are not intended to be limited by the disclosed embodiments, but are to be accorded their widest scope consistent with the principles and features disclosed herein.

Figure 1:
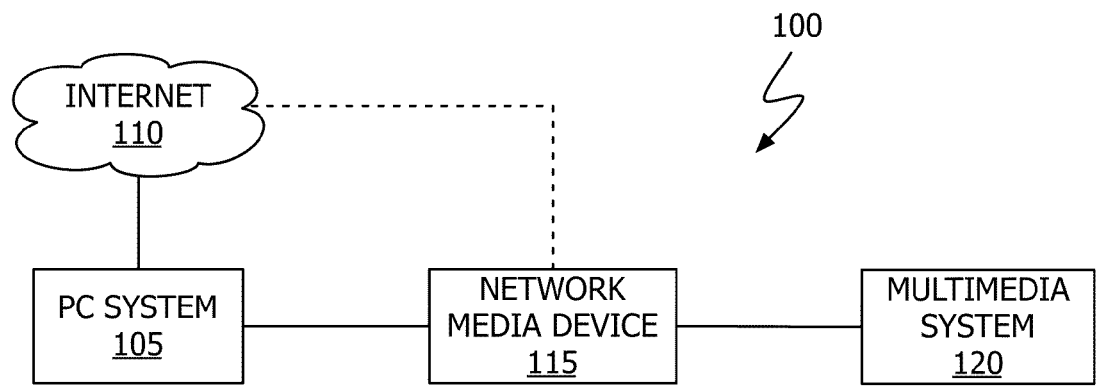
FIG. 1 shows, in block diagram form, a multimedia system in accordance with one embodiment of the invention.

Referring to FIG. 1, illustrative multimedia system 100 is shown as comprising personal computer system 105 coupled to Internet 110 and network media device 115 which, in turn, is coupled to multimedia system 120. Network media device 115 may also be coupled to Internet 110 (see dashed line). Personal computer 105 and network media device 115 may be coupled directly to Internet 105 or indirectly through, for example, a local area network or DSL or cable modem. In general, personal computer system 105 may be any computer system capable of executing a general purpose operating system such as, for example, OS X from Apple Computer or the Windows® or Linux® operating systems. (WINDOWS is a registered trademark of Microsoft corporation. LINUX is a registered trademark of Linus Torvalds.) Multimedia system 120 may comprise any system adapted to receive and play audio (e.g., analog and digital) and/or video (e.g., composite video, S-video, component video, DVI) signals.

Figure 2:
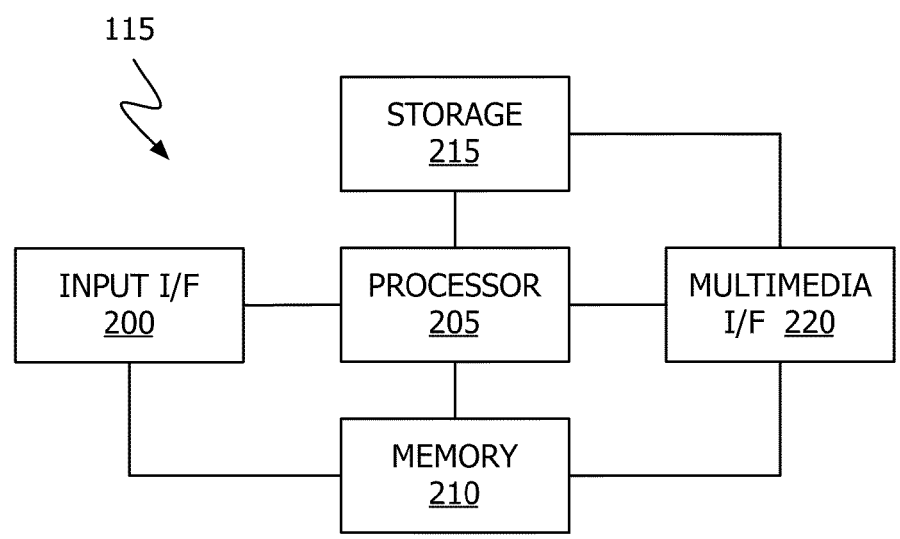
FIG. 2 shows, in block diagram form, a network media device in accordance with one embodiment of the invention.

Referring to FIG. 2, network media device 115 comprises input interface 200, processor unit 205, memory 210, storage 215 and multimedia interface 220. In one embodiment, input interface 200 includes a network interface and a peripheral interface. A network interface provides wired (e.g., Ethernet) and/or wireless (e.g., I5E 802.11b or 802.11g—"WiFi") connectivity to a computer network. A peripheral interface may include one or more connectors suitable for linking to another device such as, for example, a USB, I5E 1394 ("Firewire"), RS-232 (serial interface) or I5E 1284 (parallel interface) bus connectors. Referring to FIG. 1, for example, network media device 115 could be connected to computer system 105 through a wired network connection or by a USB bus and to Internet 110 through a wireless Ethernet connection. Processor 205 may be a single computer processor (e.g., a commercially available CICS or RISC processor), a special purpose processor (e.g., a digital signal processor, "DSP"), a plurality of interconnected processors or a custom designed state machine embodied in, for example, an application specific integrated circuit ("ASIC") or field programmable gate array ("FPGA"). Memory 210 represents random access memory (volatile and/or non-volatile), while storage 215 represents long-term non-volatile memory such as, for example, a magnetic or optical disk unit. As noted above, multimedia interface 220 comprises connectors suitable for transmitting audio (e.g., analog and digital) and/or video (e.g., composite video, S-video, component video, DVI) signals.

As used herein, a network media device (e.g., device 115) is a physical unit having non-volatile long-term storage (e.g., storage 215) and whose operation is governed by a limited-use operating system. By limited-use, it is meant that the operating system does not support the execution of a general purpose user interface (e.g., a standard windowing environment) and, therefore, the execution of general-purpose applications (e.g., word processors and drawing programs).

As noted above, a function of device 115 is to obtain multimedia files, retain them in storage 215, and then transmit them at a later time to one or more multimedia devices (e.g., a stereo or television). To facilitate these operations, device 115 preferably includes a limited-use operating system that provides a user interface to (1) identify and select multimedia files that should be obtained and (2) identify and select which multimedia files to transmit to a designated multimedia device. In one embodiment, this interface is provided through a stand-alone application executing on a general purpose computer system (e.g., personal computer system 105) through, for example, an Ethernet connection or a USB port within input interface 200. In another embodiment, device 115 provides a web interface through a network connection (wired or wireless) within input interface 200. It will be recognized that this latter approach is often provided by other network devices such as, for example, routers and firewalls. In still another embodiment, device 115 provides a user interface through a connected multimedia playback device such as, for example, a television display. In this embodiment, device 115 could transmit the visual representation of a user interface through a video output connector within multimedia interface 220.

User interaction could be mediated through a special-purpose control device unique to device 115 or a multimedia-aware remote control unit for the display unit (e.g., television). In any of these implementations, sources of multimedia data files available through input interface 200 (i.e., network and/or peripheral connectors) may be identified. For example, multimedia files or directories located on personal computer system 105 or a server computer system coupled to system 100 via Internet 110 (not shown in FIGS. 1 and 2), may be designated as a "source." Once identified, network multimedia device 115 may obtain or download the specified file(s) immediately. Alternatively, network multimedia device 115 may be commanded to obtain one or more multimedia files from a designated source location on a periodic basis. During periodic download operations, it is preferable that files already obtained and resident on storage 215 are not downloaded again. It will be recognized that this latter function is often referred to as "synchronization." Once obtained, the user interface permits a multimedia data file to be transmitted to one or more designated multimedia playback devices. In one embodiment, this action may be performed immediately (that is, as soon as the user designates both a multimedia data file and at least one target multimedia device). In another embodiment, a multimedia data file may be transmitted to one or more designated multimedia devices at a specified time.

In addition to the software-based user interfaces described above, multimedia network device 115 may provide a hardware-based interface for media file playback. For example, a surface of device 115 may include a relatively small display on which the contents of storage 215 are displayed. One illustrative display of this type is presented by the iPod electronic device. In addition, conventional PLAY, PAUSE, STOP, SKIP, FORWARD, REVERSE, REPEAT, SELECT and cursor control buttons may be provided. If the aforementioned display is capable, one or more of the identified control buttons may be "soft" buttons. Through these elements, a user may select one or more multimedia files and one or more target multimedia devices on which to play the selected file(s).

Figure 3A:
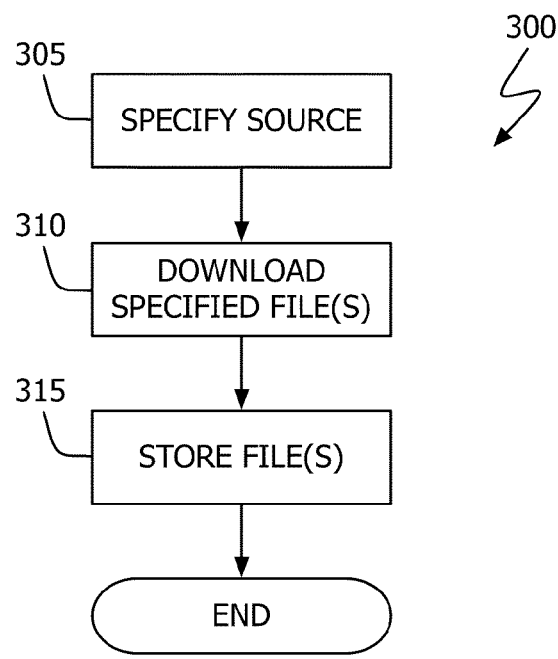
FIGS. 3A and 3B show, in flowchart form, a multimedia data source designation operation in accordance with one embodiment of the invention.

Referring to FIG. 3A, source designation process 300 for identifying one or more multimedia data files is shown. To begin, a user specifies a multimedia data source (block 305). As described above, this may include one or more files on a computer system directly coupled to multimedia device via a network or peripheral bus connector or indirectly through a computer network (e.g., the Internet or a local area network). Once designated, multimedia device 115 retrieves the specified data (block 310) and stores it internally in storage 215 (block 315). Once obtained in this manner, the multimedia data may be transmitted to one or more target devices for playback/display (see discussion below regarding FIG. 4). Additionally, by user selection, playback/display of the multimedia data may begin immediately upon designation before the transfer of the multimedia data from the source is completed.

Figure 3B:
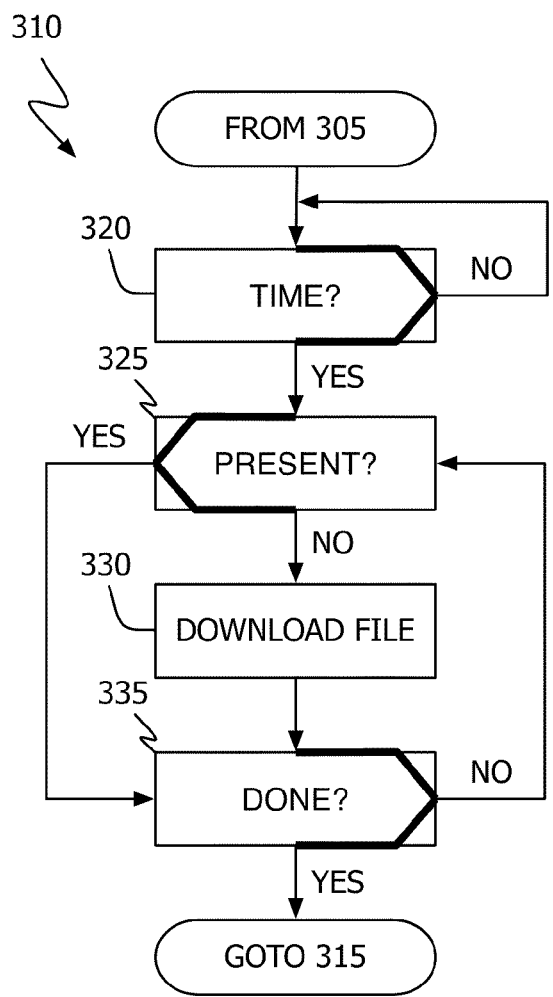

Referring now to FIG. 3B, download operation 310 is shown in greater detail. In the illustrated embodiment, a first check is made to determine if it is the proper time to download the specified file. In one embodiment, a user may specify a time at which a download should occur. In another embodiment, the user may specify an interval after which the specified file may be downloaded. In yet another embodiment, the user may specify a repeating interval wherein one or more files may be downloaded every specified interval (e.g., day or week). It will be appreciated that this latter approach is particularly useful to periodically synchronize storage 215 with one or more other storage locations (e.g., multimedia data servers). If it is not yet time (the "No" prong of block 320), the process waits until the proper time. If it is time (the "Yes" prong of block 320), a second check is made to determine if the specified file is already present in storage 215. If the file is not present (the "No" prong of block 325), the file is downloaded from the specified location (block 330). It will be recognized that some multimedia data sources may stream the specified data to multimedia device 115. In these instances, device 115 may store the data as received (i.e., in a "streaming" format) or it may convert it to a non-streaming format. If the file is present (the "Yes" prong of block 325) or at completion of the current download operation (block 330), a third check is made to determine if all of the user-specified files have been obtained. If they have (the "Yes" prong of block 335), processing continues at block 315. if they have not (the "no" prong of block 335), processing continues at block 325.

It is noted that multimedia data files may be encoded in accordance with any one of a number of different formats. For example, MPEG-1 (Moving Pictures Experts Group), MPEG-2, MPEG-4, MP3® (Motion Picture Expert's Group Layer 3), A3 (Advanced Audio Coding, a/k/a/ MPEG-4 audio), Quicktime®, AVI (Audio Video Interleave), RI6 (Resource Interchange File Format), WMA (Windows Media Audio), Ogg, etc. (MP3 is a registered trademark of Thomson Multimedia. QUICKTIME is a registered trademark of Apple computer.) The claimed invention may be used to obtain, store and transmit (to a multimedia playback device) data files using any of these, or other, data formats. It will be recognized by one of ordinary skill in the art that multimedia device 115 will incorporate decoder capability for each file format it is configured to process (e.g., software routines).

Figure 4A:
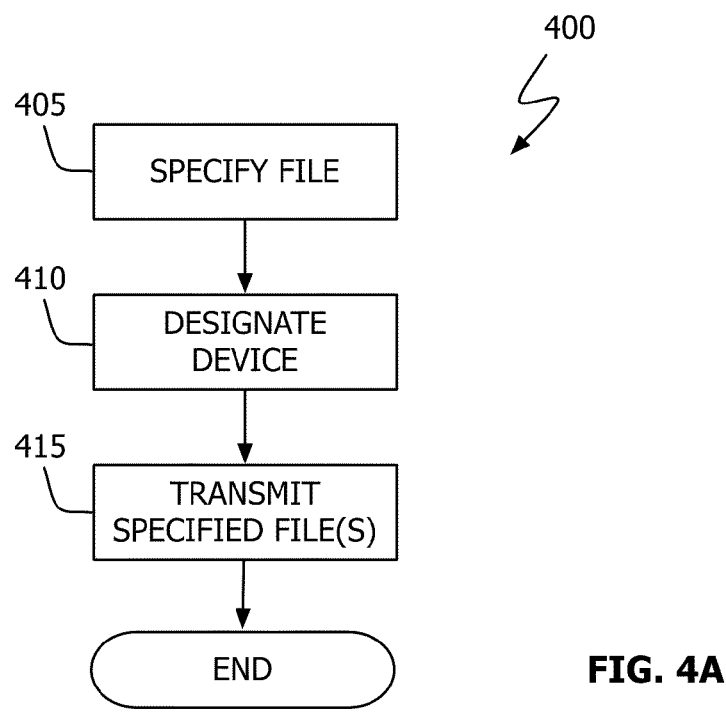
FIGS. 4A and 4B show, in flowchart form, a multimedia playback operation in accordance with one embodiment of the invention.

Referring to FIG. 4, multimedia data playback operation 400 is shown. To begin, a user specifies a multimedia data file for playback (block 405). Next, the user designates one (or more) multimedia playback units to which the specified data file should be sent (block 410). Multimedia device 115 then transmits the specified file to the designated multimedia playback unit. In one embodiment, multiple multimedia files may be selected and sent to one or more playback devices. For example, a music file may be transmitted to a stereo system in a first location while a digital video file may be transmitted to a display device in a second location—at the same time or at different times.

Figure 4B:
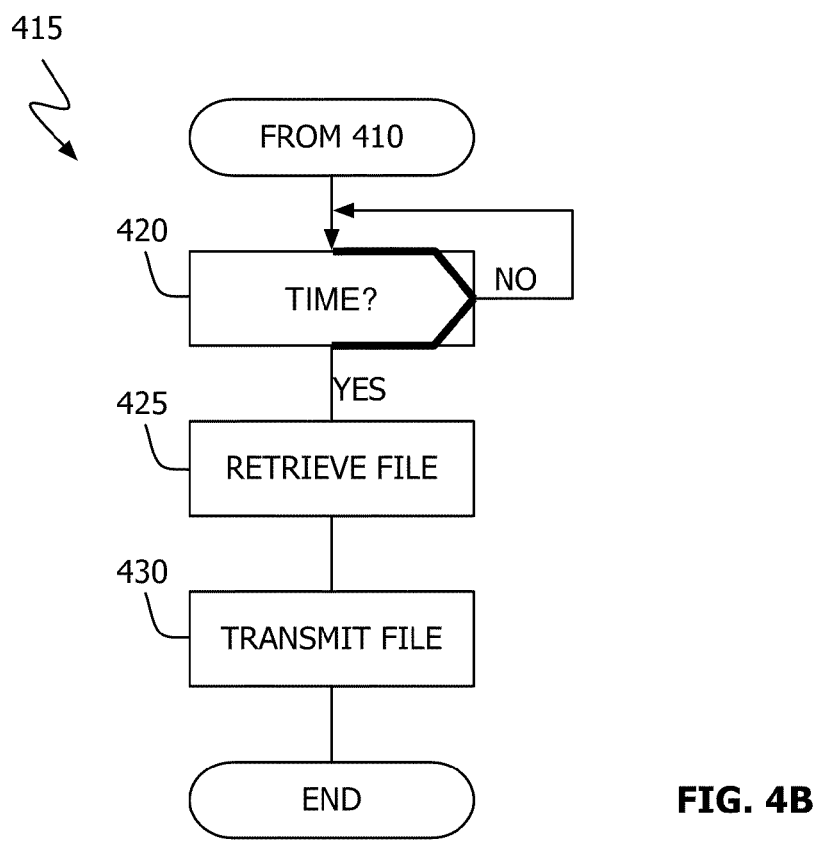

Referring now to FIG. 4B, transmit operation 415 is shown in greater detail. In the illustrated embodiment, a check is made to determine if it is the proper time to transmit the specified file. If it is not yet time (the "No" prong of block 420), the process waits until the proper time. If it is time (the "Yes" prong of block 420), the specified file is retrieved from storage 215 (block 425) and transmitted to the designated multimedia playback device via multimedia interface 220 (block 430). In one embodiment, if the target multimedia playback device supports it, device 115 could determine if the designated playback device is present and/or capable of playing the specified file (e.g., immediately prior to performing the acts of block 430). if the playback device is not available (e.g., not "online") or not able to play the specified file, an error message could be generated and/or other corrective actions taken.

It should be noted that in the discussion of FIGS. 3 and 4, various buffering, error checking, and other data transfer steps implicit in various forms of digital communications have been omitted. Nonetheless, these steps are preferably present and may be implemented in accordance with a variety of techniques known to those skilled in the art. In addition, for security and digital rights management purposes it may be desirable to determine whether networked media device 115 (and/or the user operating same) is authorized to receive the specified multimedia data files. This generally requires some form of authentication, and may be based on a public/private key system.

Because of the potentially rich feature set of network multimedia device 115 and because of the various mechanisms by which the device may interact with other devices, e.g., via network or peripheral interface, etc., the network multimedia device 115 device preferably includes automated discovery and configuration routines that simplify setup of the device. In one embodiment, for use in a network environment, the network media device 115 may use the Bonjour protocol, developed by Apple computer, to advertise the services it provides on a local network. This allows other devices, such as PC system 105 running Bonjour-compliant software, for example iTunes, to "discover" the network media device 115. Alternatively, the network media device 115 may "discover" services available on the network, such as the aforementioned PC system running iTunes.

Upon discovery of one or more services available on the network, a user interface provided by network multimedia device 115 may present a variety of options to the user. For example, the network multimedia device may present a list of multimedia libraries on the local network to which the network multimedia device may connect. This list of multimedia libraries may include libraries stored on different machines or may include different libraries stored on the same machine. Different libraries stored on the same machine may include libraries belonging to multiple users, e.g., iTunes libraries for multiple people, or may include different types of libraries, such as an iTunes library, an iPhoto® library, etc. (IPHOTO is a registered trademark of Apple Computer, Inc.) Within a given library, content may further be divided into different categories. For example, an iTunes library may include video content (television programs, movies, etc.) and audio content (music, audiobooks, Podcasts, etc.). The user may then select one or more of these shared libraries with which to connect and may further specify specific multimedia content (e.g., files) within the libraries that should be transferred to the device in accordance with one or more of the techniques described herein.

Figure 5:
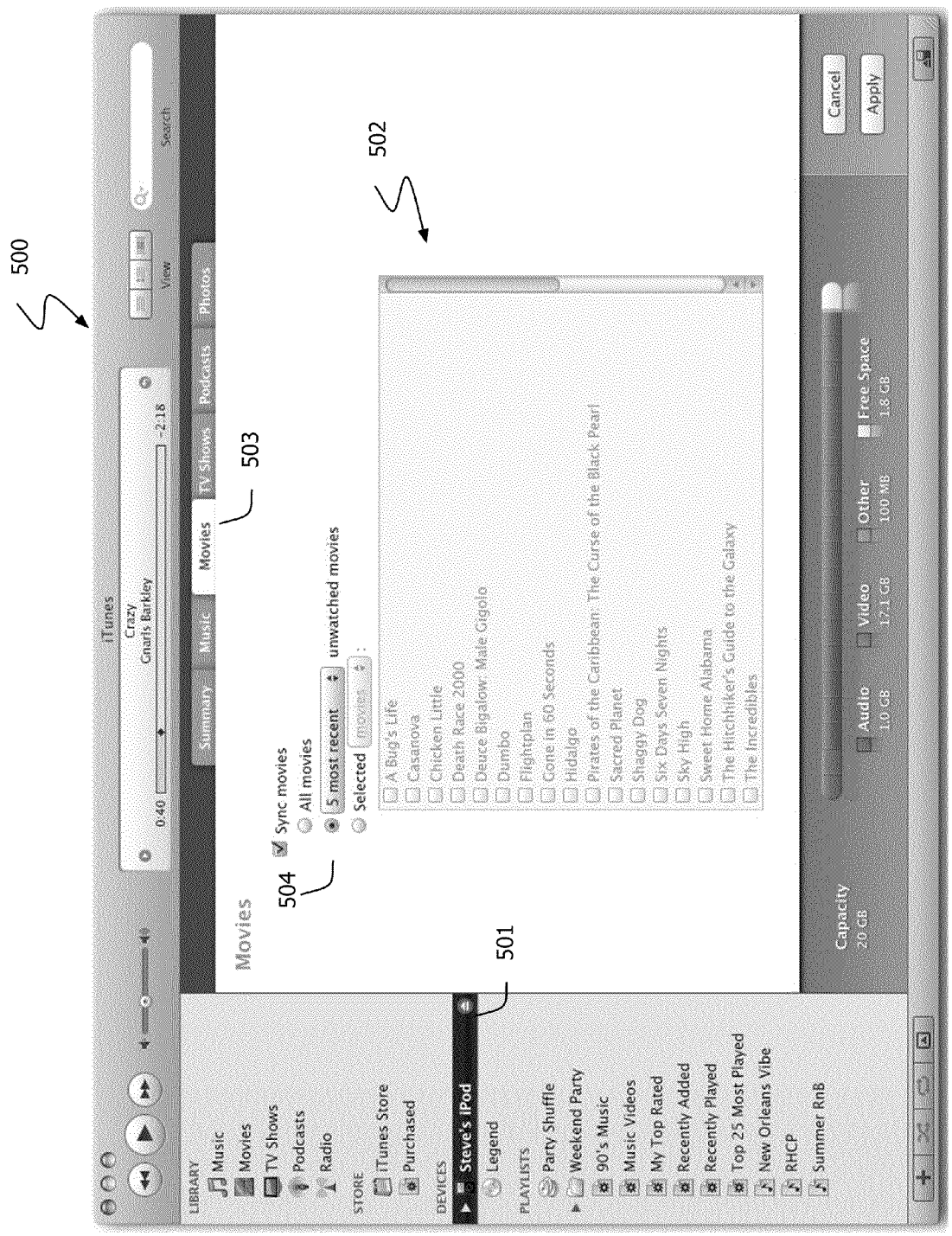
FIG. 5 shows a graphical user interface used to control synchronization between a network media device and a content source in accordance with one embodiment of the invention.
Figure 6:
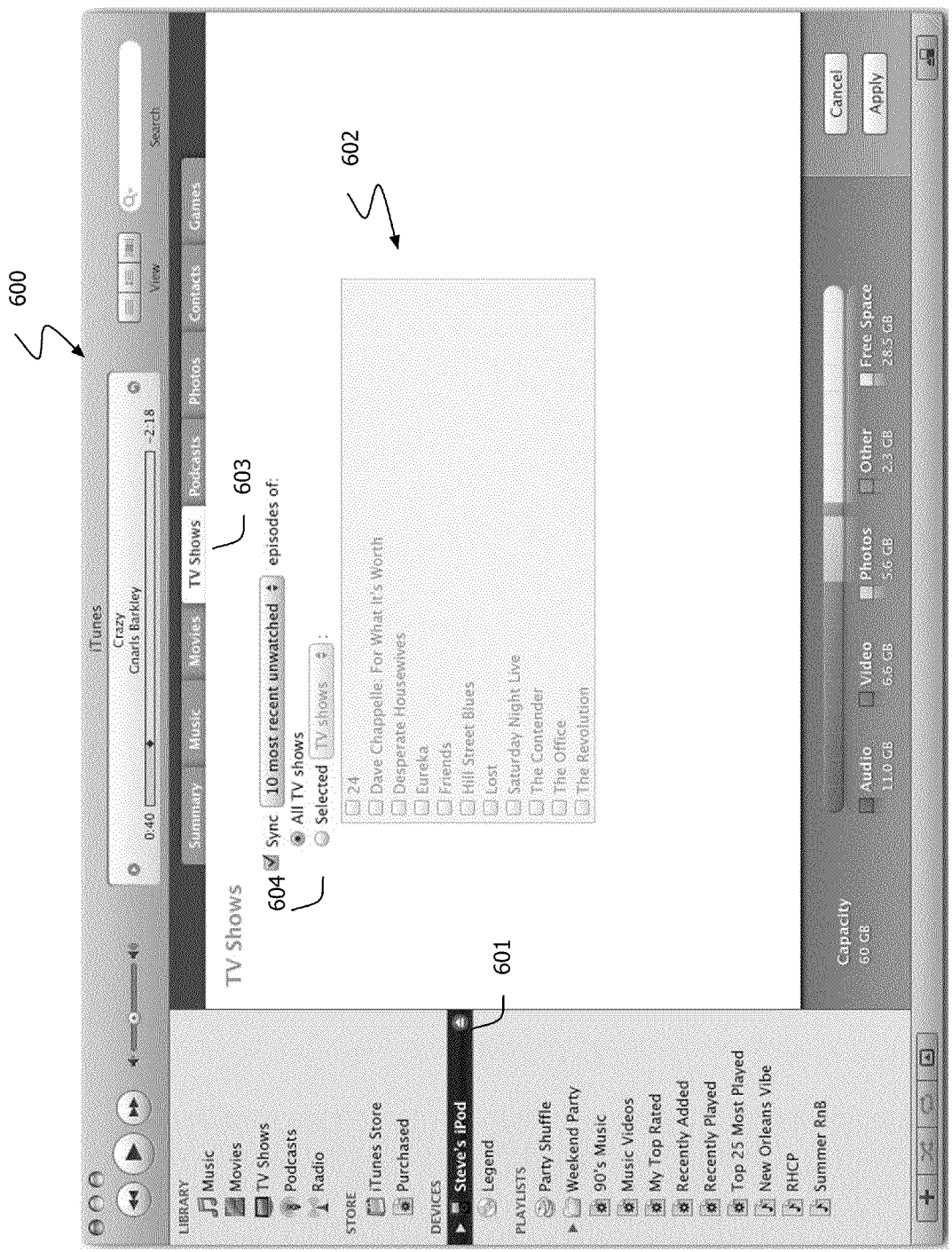

Alternatively, a user interacting with PC system 105 may also discover the services provided by network multimedia device 115. As illustrated in FIGS. 5 and 6, such a device may, for example, show up as a destination 501, 601 for multimedia content in the user interface 500, 600 of a multimedia application. The user interface provided also preferably provides the user a variety of options for which multimedia content will be transferred to the device 502, 602.

In either of the above cases, it may be desirable to "pair," i.e., uniquely associate, a network multimedia device 115 with a particular PC system 105 or a particular library or media application thereon. Upon pairing, the network multimedia device 115 preferably ceases to advertise available services on the local network, as these services are now within the exclusive control of a particular PC system or a particular library/media application thereon. This cessation of advertising services would cause the representation 501, 601 of network multimedia device 115 to "disappear" from the user interface 500, 600 of the media applications running on other PC systems on the network. Additionally, the user interface presented by network multimedia device 115 may cease to display libraries not associated with the paired computer upon establishing a pairing.

The establishment of a pairing permits network multimedia device 115 and PC system 105 to synchronize data between them. A variety of synchronization techniques have been developed in the art and may find use in conjunction with the systems described herein. Some particularly advantageous synchronization techniques are described in U.S. Patent Publication 2003/0167318, entitled "Intelligent Synchronization of Media Player with Host Computer"; U.S. Patent Publication 2003/0079038, entitled "Intelligent Interaction Between Media Player and Host Computer"; U.S. Patent Publication 2006/0168351, entitled "Wireless Synchronization Between Media Player and Host Device"; and U.S. patent application Ser. No. 11/324,863, entitled "Remote Content Updates for Portable Media Devices"; each of which is hereby incorporated by reference in its entirety.

A wide variety of synchronization parameters may preferably be specified by the user. For example, a user may choose to synchronize certain playlists. Alternatively, a user may choose to synchronize media of a particular type (e.g., video content or audio content) or a particular sub-type (e.g., video content including television programs but not movies) 503, 603. Content to be synchronized may also be specified based on a variety of other parameters 504, 604 associated with the media content. Such parameters may include: content that has not yet been played, purchased content, locally created content, newly downloaded content, content of a certain genre, content that has not been played recently, content that is played frequently, etc. For content that comes in the form of multiple episodes, e.g., television programs, Podcasts, etc., a user may also specify how many episodes should be synchronized (for example, all episodes, unplayed episodes, or a fixed number of episodes).

The synchronization features also preferably include a mechanism for specifying content that will be automatically removed from the network multimedia device 115. For example, because of the relatively high storage requirements of storing video data, it may be desirable to remove video content from the network multimedia device once it has been viewed. Alternatively, time specific content that is sufficiently old that its value has decreased substantially, e.g., week-old news broadcasts, may be automatically removed even if they have not been viewed. Of course these concepts need not be limited to video content and may equally apply to audio content.

It may also be desirable to automatically pass changes made on one device to another without waiting for a user-initiated synchronization. Such synchronization may, for example, be event based. Thus when content is played back on the network multimedia device, its status is updated on the PC system. Similarly, if a particular media file is viewed on the PC system, it may be automatically removed from the network multimedia device. In general, it may be desirable to synchronize any change, whether adding or deleting a file, viewing a file, reclassifying a file, etc. upon the occurrence of the event without waiting for a user-initiated or time-based synchronization.

It is not necessary that the network multimedia device 115 only play back content that has been transferred via synchronization with another device, particularly one with which it is paired. For example, in addition to the synchronization techniques described herein, the network multimedia device 115 may also stream content that has not been synchronized. Such content may be either non-synchronized content located on the paired device or may be content located on a non-paired device. The user interface of network multimedia device 115 may present various indications to the user as to what content is stored locally, i.e., that which as been synchronized or otherwise transferred from another device, and that which must be streamed. Such indications may take the form of highlighting, different colors, different screen windows or panes, icons, etc. Additionally, while streaming content, it may be advantageous to transfer content faster than it is played back and cache the not yet needed content on the network multimedia device. This will, in many cases, allow the transfer to be completed long before the transfer would be completed in a classic streaming context. In this way there will be no negative effect if the device from which media is being streamed is taken off line during playback of the media.

One benefit of network multimedia device 115 in accordance with the invention is that relatively large quantities of multimedia data may be obtained via a computer network and stored an the device, whereafter they may be replayed without the need for the original source to be "on-line." In contrast, prior art multimedia devices typically "stream" data so that the data source must be accessible during playback operations.

The network multimedia device 115 may also incorporate instant play technology as disclosed in U.S. patent application Ser. No. 11/131,800 entitled "Media Player With Instant Play Capability," which is incorporated by reference in its entirety.

Various changes in the materials, components, circuit elements, as well as in the details of the illustrated operational methods are possible without departing from the scope of the following claims. For instance, multimedia device 115 may include a status light to provide an indication of the device's operational state. In one embodiment, a status light could be a light emitting diode (LED) or a combination of LEDs integrated into a single package to allow illumination in different colors, e.g., green, red, and/or amber/yellow. For example, the status light may be off to indicate that the device is not powered; the light may flash in a particular color, e.g., green, to indicate that it is powering up and/or going through a startup/self-diagnostic routine; the light may illuminate in a solid color, e.g., green to indicate that it is on and functioning properly; the light may also illuminate or flash in a first color, e.g., yellow, to indicate that a download is in progress and illuminate or flash in a second color, e.g., orange, to indicate a playback transmission is in progress; and the light may illuminate or flash in yet another color, e.g., red, to indicate a problem exists, such as no playback devices in range or no network signal. Further, and as well be recognized by one or ordinary skill in the art, computer program instructions for implementing the described functionality (e.g., FIGS. 3 and 4) may be organized into routines or modules and stored in memory 210 and/or storage 215.

The invention claimed is:

1. A method of configuring a network multimedia device to receive multimedia content from a content source, wherein the network multimedia device and the content source are coupled via at least one network, method comprising:
   at a content source:
      discovering one or more services provided by a network multimedia device coupled to the content source through at least one network, wherein the one or more services provided by the network multimedia device are advertised on the at least one network using a predetermined protocol, wherein the one or more services are associated with at least one multimedia playback device coupled to the network multimedia device; and
      accepting user input to establish a paired relationship between the network multimedia device and the content source, wherein the paired relationship between the network multimedia device and the content source is exclusive.

2. The method of claim 1 further comprising:
   presenting one or more multimedia libraries each containing one or more multimedia files that may be transferred to the network multimedia device;
   accepting user input specifying which of the one or more multimedia files are to be transferred to the network multimedia device; and
   transferring the specified one or more multimedia files to the network multimedia device.

3. The method of claim 1 further comprising:
presenting one or more multimedia libraries that may be synchronized with the network multimedia device, each multimedia library containing one or more multimedia files;
accepting user input specifying which of the one or more multimedia libraries are to be synchronized with the network multimedia device; and
synchronizing between the specified one or more multimedia libraries and the network multimedia device.

4. The method of claim 3 wherein:
accepting user input specifying which of the one or more multimedia libraries are to be synchronized with the network multimedia device further comprises specifying one or more synchronization parameters; and
synchronizing between the specified one or more multimedia libraries and the network multimedia device further comprises communicating with the network multimedia device to copy one or more multimedia files to the network multimedia device and delete one or more multimedia files from the network multimedia device according to the specified synchronization parameters.

5. The method of claim 3 wherein synchronizing between the specified one or more multimedia libraries and the network multimedia device comprises automatically synchronizing in response to one or more predetermined events.

6. A non-transitory memory storage device having instructions stored thereon for causing a programmable processor unit to perform the method of configuring a network multimedia device to receive multimedia content from a content source, wherein the network multimedia device and the content source are coupled via at least one network, the method comprising:
at a content source:
discovering one or more services provided by a network multimedia device coupled to the content source through at least one network, wherein the one or more services provided by the network multimedia device are advertised on the at least one network using a predetermined protocol, wherein the one or more services are associated with at least one multimedia playback device coupled to the network multimedia device; and
accepting user input to establish a paired relationship between the network multimedia device and the content source, wherein the paired relationship between the network multimedia device and the content source is exclusive.

7. A method of configuring a network multimedia device to receive multimedia content from at least one content source, wherein the network multimedia device and the at least one content source are coupled via at least one network, the method comprising:
at a network multimedia device:
discovering on at least one network one or more services provided by at least one content source coupled to the network multimedia device through at least one network, wherein the one or more services provided by the at least one content source are advertised on the at least one network by the at least one content source using a predetermined protocol; and
accepting user input at the network multimedia device to establish a paired relationship between the network multimedia device and the at least one content source,
wherein the establishment of the paired relationship between the network multimedia device and the at least one content source causes the network multimedia device to stop advertising one or more services provided by the network multimedia device on the at least one network.

8. The method of claim 7 wherein the paired relationship between the network multimedia device and the at least one content source is exclusive.

9. The method of claim 7 further comprising:
presenting a representation of each of the at least one content sources, each of the at least one content sources having one or more multimedia libraries each containing one or more multimedia files that may be transferred to the network multimedia device;
accepting user input specifying which of the one or more multimedia files are to be transferred to the network multimedia device; and
transferring the specified one or more multimedia files to the network multimedia device.

10. The method of claim 9 wherein transferring the specified one or more multimedia files to the network multimedia device comprises streaming the one or more multimedia files to the network multimedia device.

11. The method of claim 9 further comprising:
presenting a representation of each of the at least one content sources, each of the at least one content sources having one or more multimedia libraries that may be synchronized with the network multimedia device, each multimedia library containing one or more multimedia files;
accepting user input specifying which of the one or more multimedia libraries are to be synchronized with the network multimedia device; and
synchronizing between the specified one or more multimedia libraries and the network multimedia device.

12. The method of claim 11 wherein:
accepting user input specifying which of the one or more multimedia libraries are to be synchronized with the network multimedia device further comprises specifying one or more synchronization parameters; and
synchronizing between the specified one or more multimedia libraries and the network multimedia device further comprises copying one or more multimedia files to the network multimedia device and deleting one or more multimedia files from the network multimedia device according to the specified synchronization parameters.

13. The method of claim 11 wherein synchronizing between the specified one or more multimedia libraries and the network multimedia device comprises automatically synchronizing in response to one or more predetermined events.

14. A non-transitory memory storage device having instructions stored thereon for causing a programmable processor unit to perform the method of configuring a network multimedia device to receive multimedia content from at least one content source, wherein the network multimedia device and the at least one content source are coupled via at least one network, the method comprising:
at a network multimedia device:
discovering on at least one network one or more services provided by at least one content source coupled to the network multimedia device through at least one network, wherein the one or more services provided by the at least one content source are advertised on the at least one network by the at least one content source using a predetermined protocol; and
accepting user input at the network multimedia device to establish a paired relationship between the network multimedia device and the at least one content source, wherein the establishment of the paired relationship between the network multimedia device and the at least one content source causes the network multimedia device to stop advertising one or more services provided by the network multimedia device on the at least one network.

15. A method for configuring a network multimedia device, comprising:
  advertising services provided by a network multimedia device to a plurality of content sources over a network;
  receiving requests for one or more of the services, the requested services, from one of the plurality of content sources, the requesting content source, via the network;
  pairing the requesting content source with the requested services; and
  ceasing to advertise the requested services to other of the plurality of content sources over the network.

16. The method of claim 15, wherein the pairing between the requesting content source and the requested services is exclusive.

17. The method of claim 15, further comprising:
  accepting a user input specifying one or more multimedia files, the specified multimedia files, from the requesting content source are to be synchronized with the network multimedia device; and
  synchronizing between the specified multimedia files and the network multimedia device, wherein synchronizing includes transferring to or deleting from the network multimedia device the specified multimedia files.

18. The method of claim 17, wherein the act of synchronizing is performed automatically upon a predefined event related to the specified multimedia files.

19. The method of claim 18, wherein the predefined event includes playback of the specified multimedia files on a playback device.

20. The method of claim 17, wherein the act of synchronizing is performed at predefined time intervals.

21. A non-transitory memory storage device having instructions stored thereon for causing a programmable processor unit to perform the method of configuring a network multimedia device, comprising:
  advertising services provided by a network multimedia device to a plurality of content sources over a network;
  receiving requests for one or more of the services, the requested services, from one of the plurality of content sources, the requesting content source, via the network;
  pairing the requesting content source with the requested services; and
  ceasing to advertise the requested services to other of the plurality of content sources over the network.

* * * * *